April 30, 1968     S. J. MARKOWSKI     3,380,661
THRUST DEFLECTOR
Filed April 12, 1966
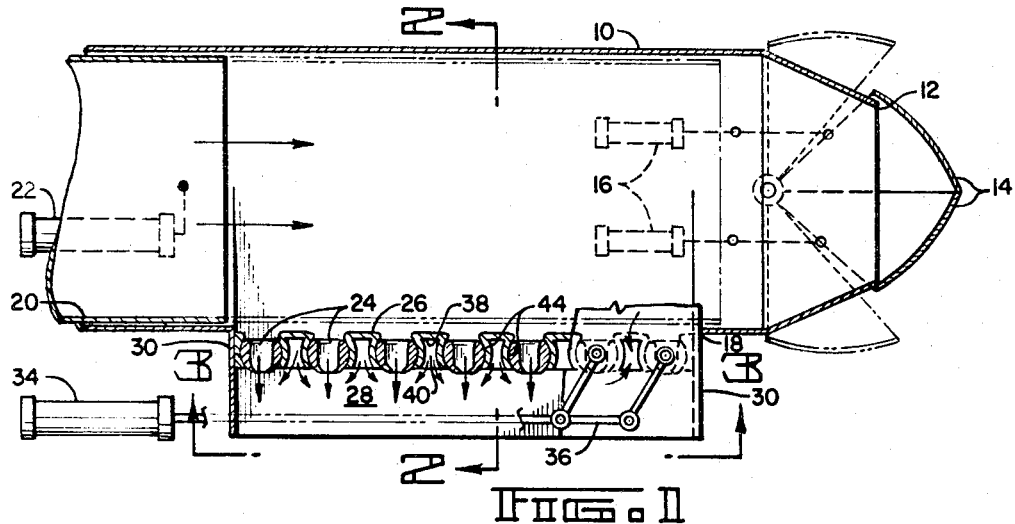
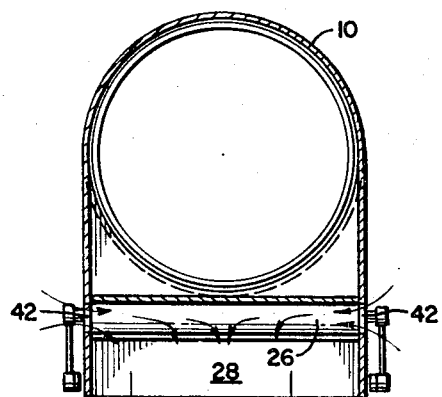
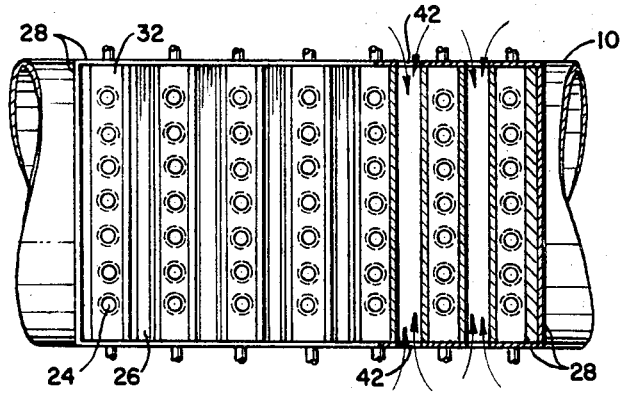
INVENTOR.
STANLEY J. MARKOWSKI
BY
ATTORNEYS.

United States Patent Office 3,380,661
Patented Apr. 30, 1968

3,380,661
THRUST DEFLECTOR
Stanley J. Markowski, East Hartford, Conn., assignor to United Aircraft Corporation, East Hartford, Conn., a corporation of Delaware
Filed Apr. 12, 1966, Ser. No. 542,166
11 Claims. (Cl. 239—265.29)

ABSTRACT OF THE DISCLOSURE

An exhaust system for a deflected gas stream such as a gas turbine engine exhaust stream, the exhaust system having a number of rows of relatively small nozzles located across an exhaust opening. The nozzles are pivotally mounted along the sides of hollow structural members which also extend across the opening and through which ambient air is drawn by ejector action to provide a cooling flow for the exhaust structure.

---

This invention relates to an exhaust configuration for a gas stream. More particularly, this invention relates to an exhaust configuration for a deflected gas stream, especially a deflected gas stream to be used for vertical take off and landing with a gas turbine engine powered aircraft.

Several significant problems are encountered in deflecting the normally axial or horizontal flow from a gas turbine engine in a downward direction for purposes of vertical take off and landing. The avoidance of engine suppression, the maintaining of a high velocity coefficient for the deflected stream, i.e. a high efficiency for the deflected stream, and minimizing weight and volume of deflection structure are particular problems of deflection directly related to the engine or the aircraft. The bleeding of engine air for cooling purposes, and the appearance of side forces, when deflection is accomplished through rotation of the primary exhaust nozzle, are also related problems. Ground blast and noise level are other areas of concern.

In the present invention the discharge outlet for either a deflected lift stream or a direct lift stream has a plurality of small nozzles and hollow structural members which are open to ambient atmosphere. The exhaust stream is directed through the small nozzles to be discharged to the ambient atmosphere, and the discharge from the small nozzles cooperates with the hollow structural members to create an ejector action and thereby draw ambient atmosphere through the hollow members. The induced flow through the hollow members serves as a cooling flow whereby the exhaust structure is cooled without the necessity of resorting to bleeding engine air for cooling purposes. This exhaust structure is compact and lightweight, and reduces ground blast and noise level. The small nozzles can be rotated for vectoring, but the constant discharge area of the nozzles eliminates the problem of variations in engine suppression often encountered during vectoring.

Accordingly, one object of the present invention is to produce a novel exhaust configuration for a gas stream.

Another object of the present invention is to provide a novel exhaust structure for a deflected or direct gas stream used for lift.

Another object of the present invention is to produce a novel exhaust structure for a deflected gas stream used for lift and/or direction control.

Another object of the present invention is to produce a novel exhaust structure for a deflected gas stream in which engine suppression remains essentially constant during deflection.

Still another object of the present invention is to produce a novel exhaust structure for a vertical take off and land engine in which cooling can be accomplished without engine bleed, and in which ground blast and noise level are reduced.

Other objects and advantages will be apparent from the accompanying drawings and description.

In the drawings:

FIGURE 1 is a partial sectional view of the discharge end of a gas turbine engine incorporating the present invention.

FIGURE 2 is a view along line 2—2 of FIGURE 1 looking upstream into the exhaust outlet of the engine.

FIGURE 3 is a view along line 3—3 of FIGURE 1 looking into a ventral exhaust outlet.

Referring now to FIGURE 1, a gas turbine engine has a duct 10 at the aft end of the engine. The engine could be either a nonafterburning engine, in which case duct 10 would be downstream of the turbine section; or it could be an afterburning type engine, in which case duct 10 would be downstream of the afterburning section. Duct 10 can be used either alone or in conjunction with other structure such as ejector structure having thrust reversers and blow-in-doors. The normal or primary discharge outlet for the gas flow from the engine is a nozzle 12 at the discharge end of duct 10. Suitable structure, such as clamshells 14 and actuators 16, is provided for selectively closing exhaust nozzle 12, clamshells 14 normally being in the open position indicated by the broken lines for normal horizontal flight. Other types of closure devices such as plugs or iris type devices could also be employed. The normal flow of gases in the operation of the engines is through exhaust nozzle 12 to provide thrust for normal flight.

An outlet 18 is also provided in the bottom side or under side of duct 10 to provide a ventral outlet for gas flow. During normal horizontal flight outlet 18 is closed off by a sleeve 20 which is powered by an actuator 22 to the position shown in broken lines. However, when it is desired to deflect the exhaust jet through outlet 18 for vertical take off and land, clamshells 14 are driven to the closed position as shown in the full lines to shut off gas flow through nozzle 12, and sleeve 20 is pulled to the retracted position shown in the full lines to open outlet 18 to the exhaust flow.

A plurality of small rotatable nozzles 24 are arranged in spaced apart rows across outlet 18, and hollow channel-like structural members 26 for supporting the nozzles are positioned across outlet 18 between the rows of nozzles 24. The nozzles 24 discharge to a box-like structure constituting a mixing chamber 28 defined by walls 30 which extend from duct 10 around outlet 18.

Referring now to FIGURE 2, the individual nozzles 24 in each row are shown as being formed in or located in a single rod-like member or housing 32. If desired, each nozzle 24 could be an individual element, but rotation of the nozzles is facilitated by the ganging arrangement shown for each row. The nozzles shown in FIGURES 1 and 2 are of the circular cross section type having the throat at the exit. The convergent-divergent type could also be used. In either case, the nozzles are preferably quite small, with throat diameters less than an inch and even as small as one-quarter or one-half of an inch, although larger nozzles could also be used.

A particular advantage of very small nozzles or slots is that the required length of the ejector-action mixing chamber 28 in the direction of flow through the chamber is proportional to nozzle discharge diameter or slot width, thus configuration volume and weight is correspondingly minimized with small nozzle size. The nozzles could also be rectangular slots with a similar small dimension across the throat rather than circular. An actuator 34 and a linkage 36 are connected to the housings 32 to impart fore and aft rotational motion to the nozzles 24.

The hollow structural channel members 26 (see FIGURES 1 and 2) located across outlet 18 between the rows of nozzles are inverted U-shaped in cross section with the closed portion 38 facing inward of duct 10 and the open portion 40 facing outward of duct 10 into chamber 28. As can be seen from FIGURES 2 and 3, the ends 42 of members 26 i.e. the legs of the U-shaped members, are open to ambient atmosphere. The outer surfaces of members 26 form bearing surfaces 44 to support housing 32 and nozzles 24 for rotation.

The flow of deflected engine exhaust gases through nozzles 24 to produce vertical thrust for lift creates an ejector action in members 26 and mixing chamber 28 whereby ambient atmosphere is drawn through the open sides 42 and discharges through the open portion 40 into mixing chamber 28. This ejector action whereby ambient atmosphere is drawn through the structural members 26 provides a flow of cooling air so that the structure across outlet 18 is cooled despite the fact that the structure is directly in the hot exhaust stream. The exhaust gases passing through nozzles 24 mix with the ejector discharge from members 26 in mixing chamber 28 and are then discharged downwardly for vertical thrust (see FIGURES 1 and 3). Nozzles 24 can be rotated fore and aft by actuator 34 and linkage 36 for vectoring, and walls 30 can be hinged to supplement vectoring fore and aft, and sideways as well if desired.

The gas discharge structure described above has many advantages over previous devices. The structure can be used with any deflected gas stream, whether for lift or direction control; and it can be used with a direct lift engine as well. The exhaust structure can be located anywhere in the aircraft, such as in the tail, the nose, or the wings, just so long as the gas stream to be discharged is ducted to it. Cooling of the exhaust structure is accomplished directly from the ambient atmosphere rather than from bleeding engine air flow; thus, cooling is accomplished without any loss of thrust in engine gas stream. Indeed, the energy content of the gas can be increased, i.e. a hotter gas stream temperature can be tolerated for higher thrust.

The ejector action whereby air is drawn through elements 26 into chamber 28 results in an airflow augmentation for added vertical thrust. However, the amount of such thrust augmentation may be kept small (on the order of 5%) in the interest of maintaining a small and lightweight total configuration for the discharge structure.

The passage of the exhaust stream through the plurality of small nozzles 24 and mixing with the ambient air drawn through element 26 results in a reduction in exhaust stream velocity thus reducing ground blast and noise level. The reduction in blast and noise level are very important considerations in the development of aircraft for vertical take off and landing for both regular airport use and for remote unprepared sites.

Still another important aspect of this gas discharge structure is that the problems of changes in engine suppression and velocity coefficient during vectoring are eliminated. In the present configuration engine suppression and velocity coefficient remain essentially constant since the flow area through the throats of the nozzles 24 remains constant during vectoring. Also, since vectoring is accomplished by moving the nozzles in one plane fore and aft, the present invention eliminates side forces associated with schemes in which the main exhaust nozzle is rotated for lift thrust.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. A gas discharge structure including a duct having an outlet:
   a plurality of nozzles positioned in said outlet to receive gases from said duct, said nozzles being arranged across said outlet in a plurality of spaced apart rows, each of said rows having a plurality of said nozzles; and
   hollow channel means positioned across said opening between said rows of nozzles each of said channel means being substantially U-shaped in cross-section with a closed side facing said duct, an open side removed from said duct, and open ends, the legs of said channel means providing support for said nozzles in the rows therebetween;
   the gas passing through said nozzle coacting with said channel means to produce an ejector action to draw ambient atmosphere flow through said channel members.

2. A gas discharge structure as in claim 1 including a mixing chamber extending from said duct, said nozzles and said hollow channel members discharging into said mixing chamber.

3. A gas discharge structure as in claim 1 wherein said nozzles are rotatably mounted, and including means for rotating said nozzles.

4. A gas discharge structure as in claim 3 including bearing surfaces on said channel members for said nozzles, said nozzles being rotatably mounted on said bearing surfaces.

5. A gas discharge structure as in claim 1 wherein said outlet is a ventral outlet, and including:
   closure means normally closing said ventral outlet;
   another outlet in said duct, said another outlet being normally open;
   and means for closing said another outlet when said ventral outlet is open.

6. A gas discharge structure as in claim 1 wherein each of said nozzles has a throat with a dimension across the throat of less than one inch.

7. A discharge nozzle for a gas turbine engine including:
   a duct positioned at the discharge end of said engine to receive exhaust gases from said engine;
   a first outlet in said duct for normally discharging exhaust gases from said engine to the ambient atmosphere;
   first closure means for selectively opening and closing said first outlet, said first outlet being normally open;
   a second outlet in said duct for discharging deflected exhaust gases from said engine to the ambient atmosphere, said second outlet being a ventral outlet;
   a plurality of nozzles positioned across said second outlet in a plurality of spaced apart rows, each of said rows having a plurality of said nozzles;
   hollow ejector means positioned across said second outlet between said rows of nozzles, each of said ejector means being substantially U shaped in cross section with a closed side facing inwardly of said duct and an open side facing outwardly of said duct, said ejector means having ends open to the ambient atmosphere, the legs of said hollow ejector means providing support for said nozzles in the rows therebetween;
   second closure means for selectively opening and closing said second outlet, said second outlet being normally closed; and
   means for actuating said first and second closure means to close said first outlet and open said second outlet, exhaust gases from said engine passing through said nozzles in said second outlet to ambient atmosphere and coacting with said ejector means to produce an ejector action to draw cooling ambient atmosphere flow through said ejectors upon closing said first outlet and opening said second outlet.

8. A discharge nozzle as in claim 7 including a mixing chamber extending from said duct around said second outlet, said nozzles and said ejectors discharging into said mixing chamber.

9. A gas discharge structure as in claim 7 wherein said nozzles are rotatably mounted, and including means for rotating said nozzles.

10. A gas discharge structure as in claim 9 including bearing surfaces on said ejector members for said nozzles, said nozzles being rotatably mounted on said bearing surfaces.

11. A gas discharge structure as in claim 7 wherein each of said nozzles has a throat with a dimension across the throat of less than one inch.

References Cited
UNITED STATES PATENTS

| | | | |
|---|---|---|---|
| 3,348,380 | 10/1967 | Rees | 60—229 |
| 2,995,894 | 8/1961 | Baxter et al. | 239—265.27 |
| 3,139,153 | 6/1964 | De Remer | 181—43 |
| 3,212,700 | 10/1965 | Guienne et al. | 239—265.25 |

ALLEN N. KNOWLES, *Primary Examiner.*

M. HENSON WOOD, JR., *Examiner.*

H. NATTER, *Assistant Examiner.*